April 8, 1941.   R. H. LYSEDAHL   2,237,884
CONTROL OF HARROWS
Filed Aug. 17, 1940   2 Sheets-Sheet 1
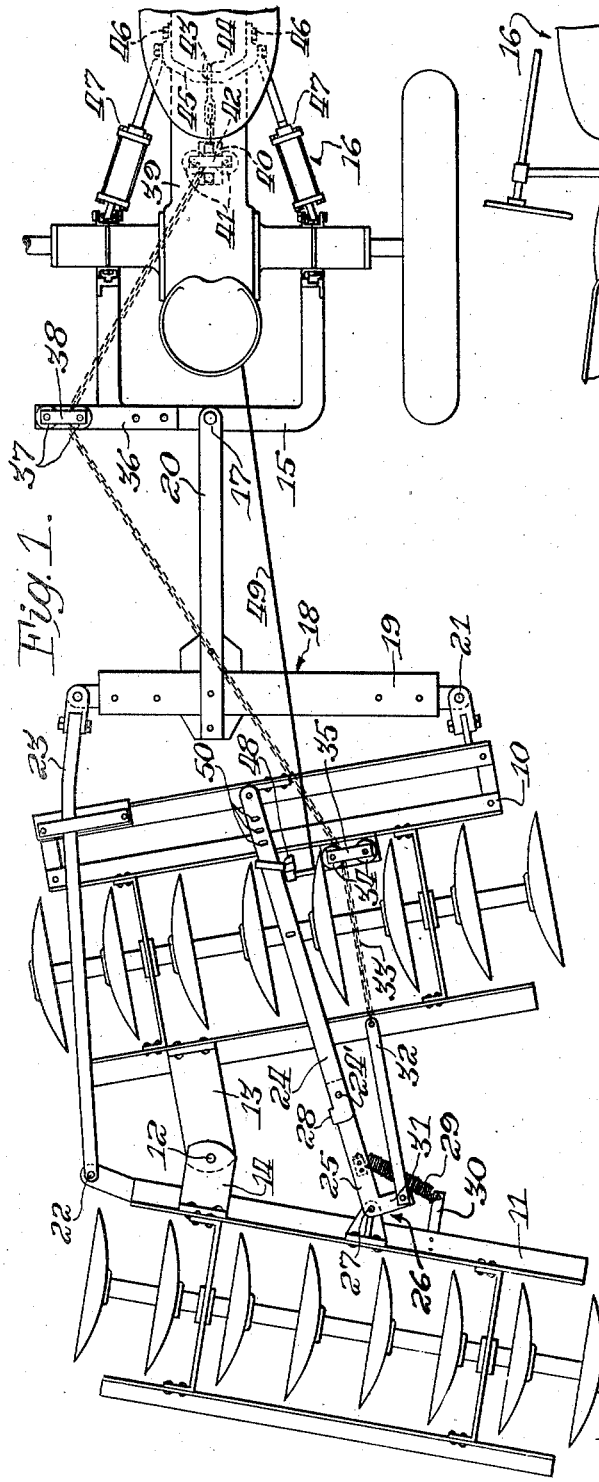
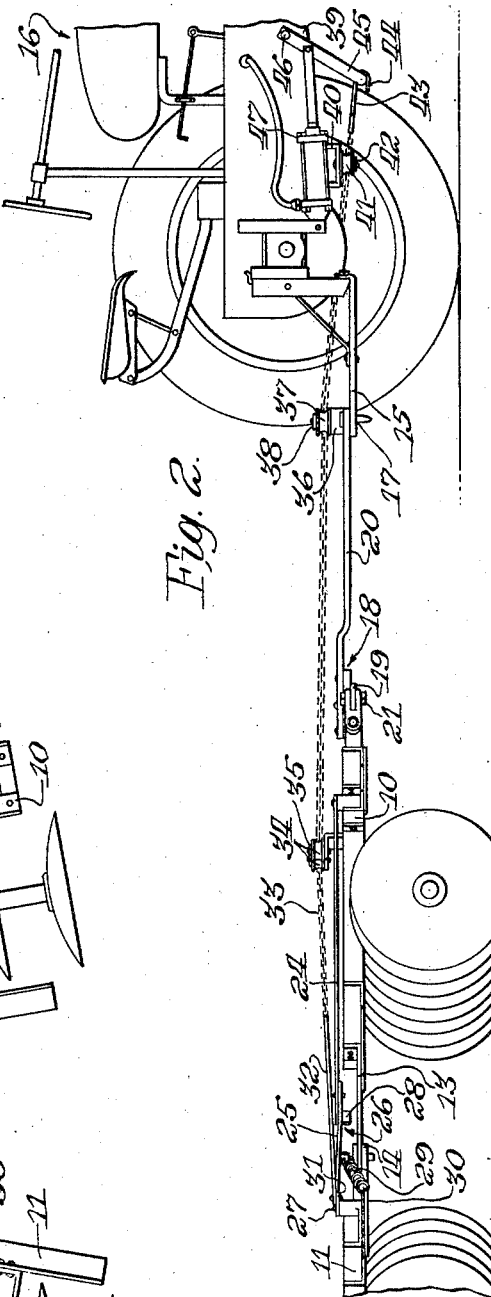
Inventor
Roland H Lysedahl
By Paul O Pippel
Atty.

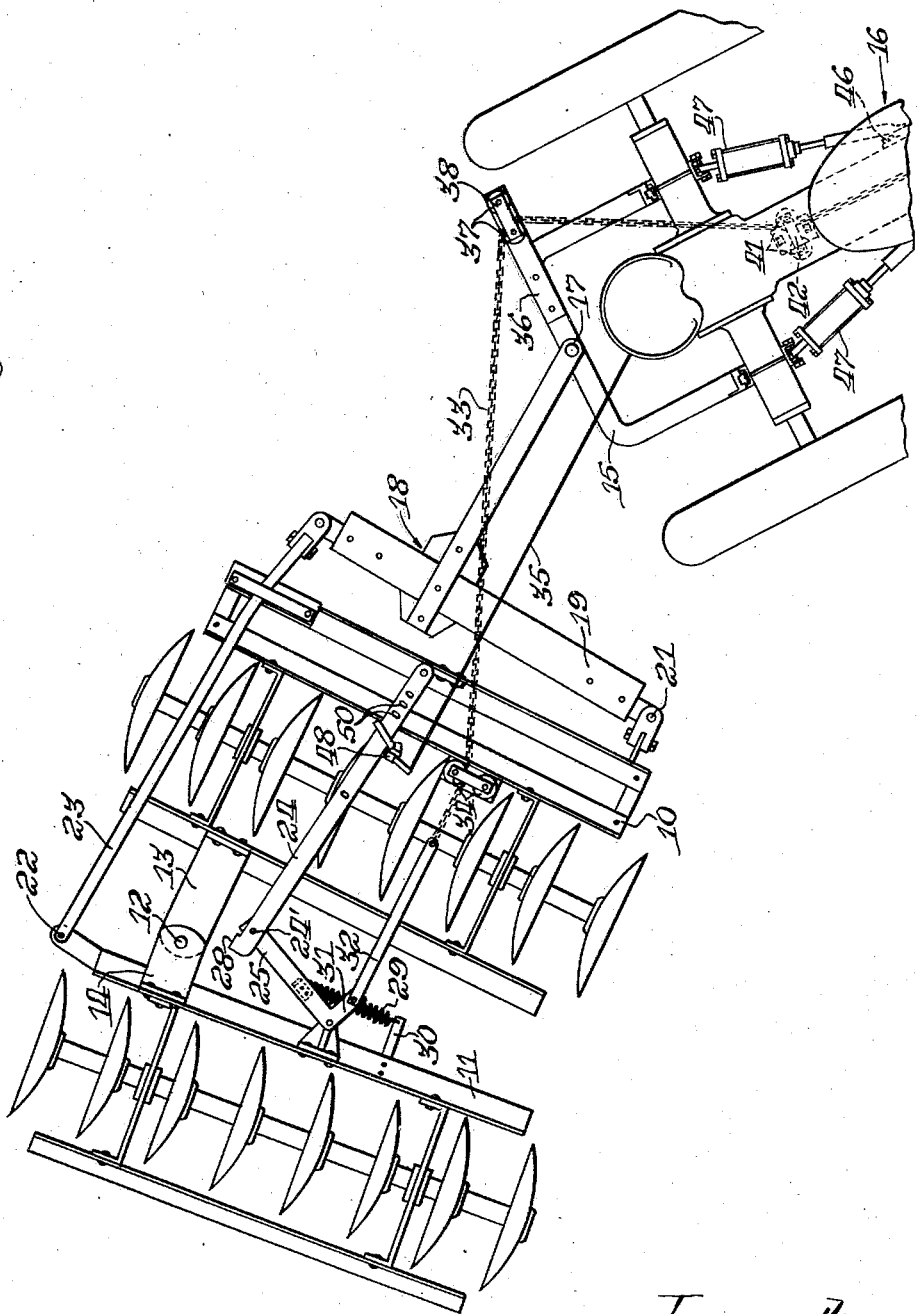

Patented Apr. 8, 1941

2,237,884

UNITED STATES PATENT OFFICE 2,237,884

CONTROL OF HARROWS

Roland H. Lysedahl, Oak Park, Ill., assignor to International Harvester Company, a corporation of New Jersey Application August 17, 1940, Serial No. 353,103

15 Claims. (Cl. 55—83)

This invention relates to a harrow control. More specifically it relates to adjustment of a harrow either by tractor power or by turning of the tractor.

It is known to adjust the gangs of a harrow by means of separate controls both by turning movement of the harrow and also by power of the tractor. The present invention is concerned with the provision of control means for a harrow by which the harrow may be adjusted both by tractor power and by turning of the tractor.

An object of the present invention is to provide an improved harrow.

A further object is the provision of an improved control means for a harrow.

Another object is to provide a control means for shifting the gangs of a harrow both by tractor power and by turning of the tractor.

According to the present invention, an offset-disk harrow composed of pivotally connected gangs is pivotally connected by means of a hitch frame to the draw-bar of a tractor. The gangs are held in working position by means of an overcenter lock which is controlled by a chain member extending from the over-center lock on the rear gang through a space enclosed by rollers offset laterally from the point of connection of the harrow hitch frame to the tractor drawbar to a U-shaped bail embracing the body of the tractor and actuated by fluid power devices. The arrangement is such that for a right-hand turn, either turning of the tractor or movement of the U-shaped bail may be relied upon for shifting of the gangs for a right turn. The U-shaped bail is also used for shifting the gangs into parallel transport position.

In the drawings:

Figure 1 is a plan view of an offset harrow in working position and the novel control means therefor;

Figure 2 is a side view of the construction shown in Figure 1; and,

Figure 3 is a plan view similar to Figure 1 but showing the harrow gangs in position for a turn to the right.

As shown in Figure 1, the offset harrow comprises a front gang 10 and a rear gang 11 pivotally connected to the front gang about a bolt 12 which pivotally connects brackets 13 and 14 extending respectively from the front and rear gangs. The harrow is pivotally connected to a U-shaped drawbar 15 of a tractor 16 at a point 17 by means of a draft frame 18 formed of a transversely extending member 19 and a longitudinally extending member 20. The transverse member 19 is pivotally connected as at 21 to the right end of the front gang and is connected at its other end to the left end of the rear gang as at 22 by means of a draft bar 23. The gangs of the harrow are locked in working position of Figure 1 by means of a link 24 connected to the front gang 10 and arm 25 of a bell crank 26 pivotally connected at 27 to the rear gang 11. The link 24 and the arm 25 are held in straight-line position by means of an abutment extension 28 on the link 24 and a spring 29 carried on the member 30 extending from the rear gang 11. The spring 29 tends to rotate the arm 25 clockwise and movement of the arm beyond the straight-line position with the link 24 is prevented by the abutment extension 28 on the link 24. Thus the link 24 and the arm 25 are held in straightline position and may be considered to constitute an overcenter lock. The bell crank 26 also has an arm 31 to which is connected a link 32 and to this link is connected a chain 33 which extends forwardly between a pair of rollers 34 on the front gangs and is completely enclosed by the rollers, the front gang, and a member 35 on top of the rollers. The chain also extends through a space offset to the left of the pivot point 17 of the hitch frame 18 on the tractor drawbar 15 and formed by an extension 36 on the draw-bar 15, a pair of rollers 37 mounted on the extension, and a member 38 positioned on top of the rollers 37. From the rollers 37 and 38 the chain extends forwardly through an enclosed space beneath a body 39 of the tractor 16, the space being formed by a member 40 carried beneath the body 39, a pair of rollers 41 carried beneath the member, and a member 42 carried beneath the rollers. The forward end of the chain is connected to a rod 43 having a hook end 44 connected to a U-shaped member 45 pivotally connected at 46 to the tractor body 39 and embracing the same. The U-shaped member 45 is controlled by a pair of fluid power devices 47 as disclosed more fully in the copending application of Carl W. Mott, Serial No. 321,154, filed February 28, 1940. The fluid power devices are shown more fully in the patent to Lindgren, 2,156,570, May 2, 1939.

When it is desired to turn the harrow to the right, a turn of the tractor to the right causes a forward movement of the rollers 37 slidably supporting the chain 33 with respect to the point of draft connection 17 of the harrow with the tractor. The result is that the chain is pulled forwardly so as to rotate the bell crank 26 counterclockwise against the action of the spring 29 and break the over-center lock formed by the arm 25 of the bell crank and the link 24. Further pulling upon the chain 33 in a turn to the right causes the rear gang 11 to be moved forwardly so that the gangs assume the relative position of Figure 3 in which position a turn to the right may be made. The harrows may also be released from locked position and shifted for a right turn by action of the power of the tractor. The fluid power devices 47 may be actuated so as to move the U-shaped bail member forwardly; as a result, the chain 33 is moved forwardly, the over-center lock holding the gangs against relative movement is released and the gangs are shifted for the turn to the right. This shifting of the gangs by tractor power for a turn to the right may take place even before the tractor is turned to the right. The tractor power may also be used for shifting the gangs into parallel transport position. Normal operation of the harrow and the control means therefor will include shifting of the gangs for a turn to the right through the action of the tractor in a turn to the right with no action by the tractor power, and shifting of the gangs to transport position by means of tractor power.

The advantage of the present construction is that the harrow gangs may be shifted for a turn to the right by means of a turn to the right of the tractor, and the gangs may be shifted to transport position without backing of the tractor with employment of only a single control means employed both for shifting of the gangs by turning and for shifting by tractor power.

The link 24 is connected to the front gang 10 by means of a latch 48 controlled by a cord 49 extending to the tractor and engaging any one of a series of holes 50 in the link 24. The particular hole 50 engaged determines the effective length of the link 24 and consequently, the relative angle of the gangs in working position.

The intention is to limit the invention only within the spirit and scope of the appended claims.

What is claimed is:

1. In combination, a tractor having a power plant, a harrow comprising front and rear gangs connected to one another for relative movement and to a point on the tractor, means connecting the harrow and a point on the tractor off-set laterally in one direction from the point of connection of the harrow with the tractor for changing the position of one gang with respect to one another for a turn in the opposite direction, and means connecting the aforesaid means and the tractor power plant for changing the position of one gang with respect to the other by tractor power.

2. In combination, a tractor having a power plant, a harrow connected to the rear of the tractor and comprising gangs connected to one another for relative movement, means connecting the harrow and the tractor for changing by a turn of the tractor in one direction the position of one gang with respect to the other for a turn of the harrow in that direction, and means connecting the aforesaid means and the tractor power plant for changing the position of one gang with respect to the other by tractor power.

3. In combination, a tractor having a power plant, a harrow connected to the rear of the tractor and comprising gangs connected to one another for relative movement, means holding the gangs against relative movement, means connecting the holding means and the tractor for releasing the holding means by a turn of the tractor, and means connecting the tractor power plant and the aforesaid means for releasing the holding means by tractor power.

4. In combination, a tractor having a power plant, a harrow comprising front and rear gangs connected to one another for relative movement and to a point on the tractor, means holding the gangs against relative movement, means connecting the holding means and a point on the tractor off-set laterally in one direction from the point of connection of the harrow with the tractor for releasing the holding means for a turn of the harrow in the opposite direction, and means connecting the aforesaid means and the tractor power plant for releasing the holding means by tractor power.

5. In combination, a tractor having a power plant, a pair of tools connected at the rear of the tractor, means for holding the tools against relative movement, means connecting the holding means and the tractor for releasing the holding means upon a turn of the tractor, and means connecting the tractor power plant and the aforesaid means for releasing the holding means by tractor power.

6. In combination, a tractor having a power plant, a pair of tools connected to a point at the rear of the tractor, means holding the tools against relative movement, means connecting the holding means and a point on the tractor off-set laterally in one direction from the point of connection of the tools with the tractor for releasing the holding means for a turn in the opposite direction, and means connecting the aforesaid means and the tractor power plant for releasing the holding means by tractor power.

7. In combination, a tractor having a power plant, a harrow comprising front and rear gangs connected to one another for relative movement and to a point at the rear of the tractor, means connecting the harrow and the tractor power plant and slidably supported at a point offset laterally from the point of connection of the harrow with the tractor.

8. In combination, a tractor having a power plant, a harrow comprising front and rear gangs connected to one another for relative movement and to a point at the rear of the tractor, means holding the gangs against relative movement, and means for releasing the holding means, said means connecting the holding means and the tractor power plant and being supported at a point offset laterally from the point of connection of the harrow with the tractor.

9. In combination, a tractor having a power plant and a body, a U-shaped bail pivotally connected to the body and embracing the underside of the tractor, means connecting the tractor power plant and the U-shaped bail, a harrow comprising front and rear gangs connected to one another for relative movement and to a point on the tractor, means for holding the gangs against relative movement, a pair of rollers mounted on the tractor so as to enclose a space at a point offset laterally from the point of connection of the harrow with the tractor, and a flexible connection between the holding means and a point on the U-shaped bail beneath the tractor passing between the space enclosed by the rollers.

10. In combination, a tractor having a power plant and a body, a U-shaped bail pivotally connected to the body and embracing the underside of the tractor, means connecting the tractor power plant and the U-shaped bail, a harrow comprising front and rear gangs connected to one another for relative movement and to a point on the tractor, a pair of rollers mounted on the tractor so as to enclose a space at a point offset laterally from the point of connection of the harrow with the tractor, and a flexible connection for shifting one gang with respect to another, said connection extending between the harrow and a point on the U-shaped bail beneath the tractor and passing between the space enclosed by the rollers.

11. In combination, a tractor having a power plant, an implement connected to the tractor, means connecting the implement and the tractor for adjusting the implement by a turn of the tractor, and means connecting the aforesaid means and the tractor power plant for adjusting the implement by tractor power.

12. In combination, a tractor having a power plant, an implement connected to the tractor, means holding the implement against adjustment, means connecting the holding means and the tractor for releasing the holding means by a turn of the tractor, and means connecting the aforesaid means and the tractor power plant for releasing the holding means by tractor power.

13. In combination, a tractor having a power plant, an implement connected to the tractor, means holding the implement against adjustment, means connecting the implement and the tractor for releasing the holding means and for adjusting the implement by a turn of the tractor, and means connecting the aforesaid means and the tractor power plant for releasing the holding means and for adjusting the implement by tractor power.

14. In combination, a tractor having a power plant, a pair of tools connected at the rear of the tractor and to one another, means connecting the tools and the tractor for changing by a turn of the tractor the position of one tool with respect to the other, and means connecting the aforesaid means and the tractor power plant for changing by tractor power the position of one tool with respect to the other.

15. In combination, a tractor having a power plant, a harrow connected to the tractor and comprising front and rear gangs connected to one another, means holding the gangs against relative movement, means connecting the tractor with the holding means and a gang for releasing the holding means and for changing the position of one gang with respect to the other by a turn of the tractor, and means connecting the aforesaid means and the tractor power plant for releasing the holding means and for changing the position of one gang with respect to the other by tractor power.

ROLAND H. LYSEDAHL.